(12) United States Patent
Sekihara et al.

(10) Patent No.: US 7,988,441 B2
(45) Date of Patent: Aug. 2, 2011

(54) OPTICAL ELEMENT MOLDING APPARATUS

(75) Inventors: Kanji Sekihara, Toyokawa (JP);
Shinichiro Hara, Toyokawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/438,828

(22) PCT Filed: Aug. 8, 2007

(86) PCT No.: PCT/JP2007/065523
§ 371 (c)(1),
(2), (4) Date: Feb. 25, 2009

(87) PCT Pub. No.: WO2008/026431
PCT Pub. Date: Mar. 6, 2008

(65) Prior Publication Data
US 2009/0324764 A1 Dec. 31, 2009

(30) Foreign Application Priority Data

Aug. 30, 2006 (JP) ................................. 2006-234354

(51) Int. Cl.
*B29C 33/22* (2006.01)

(52) U.S. Cl. ...................... 425/190; 425/450.1; 425/589

(58) Field of Classification Search .................. 425/190, 425/450.1, 443, 589, DIG. 127
See application file for complete search history.

(56) References Cited

U.S. PATENT DOCUMENTS 5,456,588 A * 10/1995 Yonekubo et al. ............ 425/190
7,381,041 B2 * 6/2008 Wilber .......................... 425/443

FOREIGN PATENT DOCUMENTS

JP 07-186154 * 7/1995

* cited by examiner

*Primary Examiner* — James Mackey
(74) *Attorney, Agent, or Firm* — Finnegan, Henderson, Farabow, Garrett & Dunner, L.L.P.

(57) ABSTRACT

An optical element manufacturing apparatus is provided with a fixed side metal mold 5 attached to a fixed platen 1, and a movable side metal mold 6 attached to a movable platen 2. The fixed side metal mold 5 and the movable side metal mold 6 are clamped by bringing both platens 1 and 2 close to each other. In the clamped status, a molding material is injected into a molding cavity between the both metal molds and an optical element is produced. A taper recessed section 11*a* and a taper protruding section 21*a*, provided on the fixed side metal mold 5 and the movable side metal mold 6 respectively, fit each other. The movable side metal mold 6 provides a friction mechanism section 23 which permits the metal mold to shift within a plane perpendicular to the clamping direction with respect to the movable platen 2.

6 Claims, 5 Drawing Sheets

OPTICAL ELEMENT MOLDING APPARATUS

TECHNICAL FIELD

The present invention relates to an optical element manufacturing apparatus to mold an optical element through injection molding by injecting a resin into a clamped metal mold, and in particular to an optical element manufacturing apparatus to mold the optical element by enhancing repeatability of mold clamping.

BACKGROUND

There have been manufactured various kinds of molded products by injection molding using metal molds. Generally, in the injection molding apparatus, a cavity is formed by clamping a movable mold and a fixed mold, thus a positioning accuracy of both metal molds are an important factor. In consecutive molding, a high positional repeatability of the fixed metal molding and the movable metal molding is particularly required. Thus it has been carried out that the metal mold is positioned in respect to the platen of the molding apparatus to fix it. However, even if each metal mold is position precisely onto the both platens of fixed side and movable side respectively to fix, the accuracy of the molded products depends on repeatability of mold clamping of the molding apparatus.

There has been a molding apparatus employing a taper shape for axis matching of the fixed side and the movable side at a parting surface (for example referred to Patent Document 1: Unexamined Japanese Patent Application Publication No. H9-1595). In the metal mold for injection molding described in the Patent document, taper fitting surfaces are formed at the parting surface, thus the accuracy of axis matching between a cavity bush and a core bush is deemed to be enhanced.

Patent Document 1: Unexamined Japanese Patent Application Publication No. H9-1595

DISCLOSURE OF THE INVENTION

Problem to be Solved by the Present Invention

However, in case the taper shape is employed for the parting surface, the fitting surfaces of the taper rub each other every time the molds are clamped. Thus a force other than the clamping force may be applied to the taper section due to variations caused by an imbalance of taper matching, an expansion or a contraction in accordance with fluctuations of platen temperature and mold clamping of the molding device. When the above phenomenon is repeated by consecutive molding, there has been a possibility that distortion or deviation wear at taper matching portion occur. If the taper section is worn with deviation or distorted, there has been a problem that axis matching accuracy is deteriorated.

The present invention is to solve the problems of the conventional metal mold for injection molding described in the forgoing. An object of the present invention is to provide an optical element molding apparatus which prevents the molding apparatus from misaligning of the axes at mold clamping, even when consecutive molding is carried out.

Means to Solve the Problem

To achieve at least one of the abovementioned objects, an optical element molding apparatus reflecting one aspect of the present invention comprises; a first platen, a first metal mold attached to the first platen, a second platen and a second metal mold attached to the second platen. The optical element molding apparatus clamps the first metal mold and the second metal mold by bringing the first platen and the second platen close to each other, and in the clamped status, a molding material is injected into a molding cavity between the both metal molds and an optical element is produced. The first metal mold is provided with a first mold matching surface and the second metal mold is provided with a second mold matching surface, which is matched with the first mold matching surface. The first matching surface is provided with a first taper shape and the second metal matching surface is provide with a second taper shape, which fits in the first taper shape. A first friction mechanism, which permits the first metal mold to shift within a plane perpendicular to the clamping direction with respect to the first platen, is disposed between the first platen and the first metal mold, and the first friction mechanism includes an elastic member.

According to the optical element molding apparatus of the present invention, the first mold matching surface of the first metal mold and the second mold matching surface of the second metal mold are clamped, and the cavity is formed therebetween. When clamping the molds, the first taper shape provided at the first matching surface and the second taper shape provided at the second matching surface are matched to each other. Whereby, axis aligning of the first metal mold and the second metal mold is carried out. When this occurs, since the first friction mechanism is provided with a first friction mechanism, movement of the first metal mold in the surface perpendicular to the clamping direction is permitted. Therefore, the first taper shape of the first metal mold can be mated with the second taper shape of the second metal mold without conflict comfortably and there is no possibility of deviated wear or distortion. Also, since the first friction mechanism includes the elastic member, even in case the first metal mold is clamped in a state where the first metal mold is deviated in the surface perpendicular the clamping direction, a force of mold clamping can be applied to the first and the second metal molds securely. Whereby, a fluctuation of axis deviation of mold clamping is avoided even when the consecutive molding is carried out.

Further, in the present invention it is preferred that a drop prevention member is provided to restrict a downward movement of the first metal mold by the gravity. By this member, since the weight of the first metal mold is supported by the drop prevention member, the weight of the first metal mold cannot be applied onto the first friction mechanism. Whereby, a hazardous force is not applied to the fist friction mechanism.

Still further, in the present invention, there is provided a second friction mechanism to allow a movement of the second metal mold in respect to the second platen in the plane perpendicular to the clamping direction. The second friction mechanism is preferred to include an elastic member which can be compressed when clamping the molds. Whereby, since positioning of both platens can be carried out, positioning of the first and second mold fixed onto the platens thereof can be carried out accurately. Thus, compared to positioning of only one side, positioning with high accuracy can be carried out readily in the present invention.

Furthermore, in the present invention, it is preferred that the first platen is movable and the second platen is fixed. Usually in the fixed platen or metal mold of fixed side, paths through which the injected resin passes are provided, and curving sections and steps in the path may be of obstructs of the resin material to pass through. In the above configuration, since the metal mold on the fixed side is securely fixed onto the fixed platen, the obstructs are not formed in the paths.

Effect of the Invention

The optical element forming apparatus of the present invention prevents the fluctuation of axis deviation at mold clamping, even when consecutive molding is carried out.

DESCRIPTION OF SYMBOLS

Figure 1:
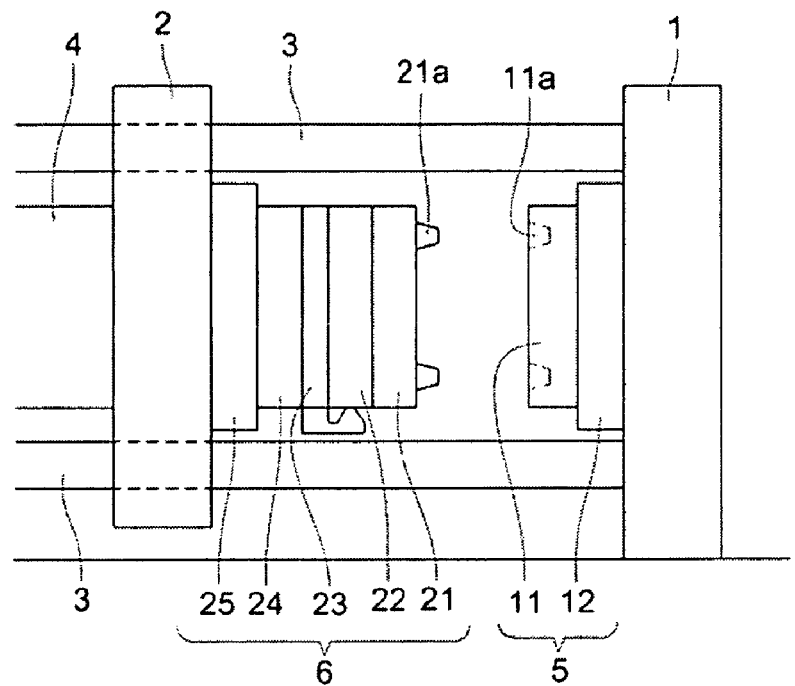
FIG. 1 is a schematic configuration diagram showing a main portion of an injection molding apparatus device related to the present invention.

1 Fixed platen
2 Movable platen
5 Fix side metal mold
6 Movable side metal mold
11a Taper recessed section
21a Taper protruding section
23 Friction mechanism section
23a Friction section
23b molding plate drop prevention section

THE PREFERRED EMBODIMENT OF THE INVENTION

With reference to the attached drawings, preferred embodiments of the present invention will be described in details as follow. The present embodiments, to which the present invention is applied, are injection mold apparatuses to mold optical elements.

As FIG. 1 shows, the main portion of the present invention is provided with a fixed platen 1 fixed onto a base and a movable plate 2 capable of moving back and forth substantially parallel in respect to the fixed platen 1. A plurality of tie bars 3 penetrating the movable platen 2 are provided parallel to each other and an end of each tie bar 3 is fixed onto the fixed platen 1. Further, on the left side of the movable platen 2 in the figure, a driving section 4 to move the movable platen 2 in left and right direction in the figure is provided. In addition, a fixed side metal mold 5 and a movable side metal mold 6 are mounted on the fixed platen 1 and the movable platen 2 respectively.

As FIG. 1 shows, the fixed side metal mold 5 is provided with a fixed side mold plate 11 and a fixed side attaching plate 12. As FIG. 1 shows, the movable side metal mold 6 is provided with a movable side mold plate 21, movable side receiving plate 22, a friction mechanism section 23, a spacer block 24 and a movable side attaching plate 25. When the movable platen 2 is moved by the driving section 4 to rightward in the figure for clamping, the fixed side mold plate 11 and movable side mold plate 21 contact each other. Then, a molding cavity is formed between the mold plates thereof. Hereinafter, a moving direction of the movable platen 2 representing left and right directions in the figure are called axis directions.

In the metal mold of the present embodiment, as FIG. 1 shows, taper recessed sections 11a are disposed at least at two positions on a left surface of the fixed side mold plate 11, and the same number of taper protruding sections 21a are disposed on a right surface of the movable side mold plate 21 in the figure. An inner surface of the taper recessed section 11a and the outer surface of the taper protruding section 21a have substantially the same shapes and the taper recessed section 11a and the taper protruding section 21a are disposed in the positions corresponding to each other. By matching of the taper recessed section 11a and the taper protruding section 21a, the fixed side mold plate 11 and the movable side mold plate 21 are aligned.

Since the taper recessed section 11a and the taper protruding section 21a rub each other, a material of the sections thereof is preferred to be subject to hardening treatment (quenching/tempering treatment or coating) or low friction treatment (coating). Alternatively, a rolling mechanism (balls or rollers) can be provided at the slant surface of the taper recessed section 11a or the taper protruding section 21a. While the shape of the taper sections are preferred to be a conical shape or a conical trapezoid shape, other taper shape, for example, a pyramidal shape, a pyramidal trapezoid shape or a wedge shape (a pyramidal shape having a slant surface only one side) are possible.

Figure 2:
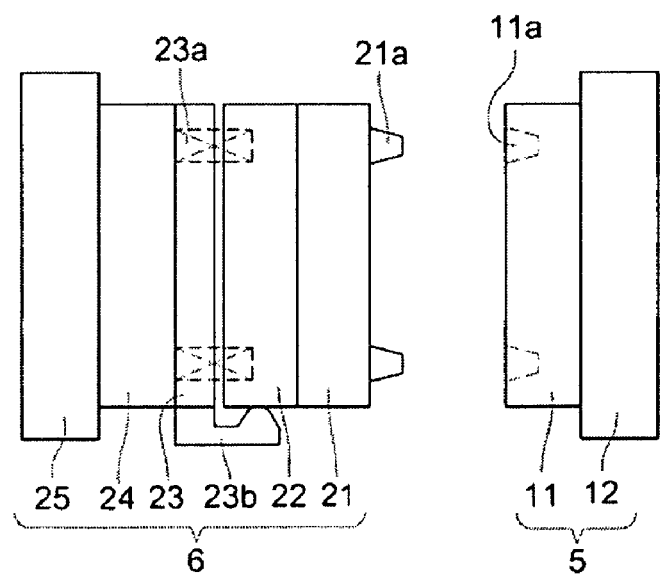
FIG. 2 is an explanatory diagram showing metal molds in an open state.

Also, as FIG. 2 shows, the friction mechanism section 23 is provided with one or a plurality of the friction sections 23a protruding rightward in the figure from the inside thereof. The friction section 23a can be elongated and contracted in the axis direction. Further, both ends of the friction section 23a in the axis direction are allowed to move to an extent in a plane perpendicular to the axis direction. In the present embodiment, a position of a left end section of each friction section 23a in the figure is fixed in respect to a right surface of the spacer block 24 in the figure. Also, left end section of each friction section 23a in the figure is engaged to be movable in an extent in a plane not perpendicular to the axis direction at a left surface of the movable side receiving plate 22 or rather inside the left surface. As the friction section 23a, for example, spring or ball plunger can be utilized.

Namely, since the movable side metal mold 6 of the present embodiment is provide with the friction mechanism section 23, a tolerance of a predetermined range in the plane perpendicular to the axis direction is allowed between the spacer block 24 and the movable side receiving plate 22. The movable side attaching plate 25 and the spacer block 24 of the movable side metal mold 6 are fixed onto the movable platen 2, and the movable side receiving plate 22 and movable side mold plate 21 are fixed each other. Thus, in the present embodiment, the movable side receiving plate 22 and movable side mold plate 21 are allowed to move to an extent in the plane perpendicular to the axis direction.

Further. The friction mechanism section 23 is provided with the mold plate drop prevention section 23b at a lower % end section thereof. As the above structure, if the mold plate drop prevention section 23b is not provided, the weights of the movable side receiving plate 22 and the movable side mold plate 21 are supported by the friction section 23a which are considerably heavy. Thus it is difficult to support it by, for example, a member such as a spring of the friction section 23a and the friction section 23a may be distorted. Therefore, the mold plate drop prevention section 23b to take the weight of two members thereof is provided.

A left end section of the mold plate drop prevention member 23a in the figure is fixed at the lower surface of the friction mechanism section 23, and an upper surface of the right end section thereof having a slippery member such a bearing is in contact with a lower surface of the movable side receiving plate 22. Also, the mold plate drop prevention member 23b is formed with a material having a flexibility in a degree where movement of the movable side receiving plate 22 in upward and downward direction is not disturbed. Further, by adding a position adjusting mechanism to the mold plate drop preventing mechanism 23b, a state where the movable side receiving plate 22 and movable side mold plate 21 are moved in advance in a plane perpendicular to the axis direction can be retained. Whereby, when the taper recessed section 11a and the taper protruding section 21a are fitted, the force applied the taper sections can be minimized.

Therefore, even if the movable side receiving plate 22 and the movable side mold plate 21 move in the plane perpendicular to the axis direction, the friction section 23a can bear the weight thereof. The mold plate drop prevention section 23b can be a lengthen shape member extended across an entire lower surface of the friction mechanism section 23 in a depth direction in the figure, or can be one or a plurality of short members which can be disposed at the lower surface of the friction mechanism section 23 so that all members bear the weight.

Next open and close of the molds in the injection molding apparatus of the present embodiment will be described. FIG. 1 and FIG. 2 show a mold open state. In the mold open state, the fixed side metal mold 5 and the movable side metal mold 6 are completely separated. In this moment, the fixed side metal mold 5 is fixed onto the fixed platen 1 and each member is fixed each other.

On the other hand, in the movable side metal mold 6, the movable side mold plate 21 and the movable side receiving plate 22 are fixed each other, and the plates thereof are connected with the spacer block 24 via the friction mechanism section 23. By spring property of the friction mechanism section 23, as FIG. 2 shows, there is a slight gap between the friction mechanism section 23 and the movable side receiving plate 22. Meanwhile, in the figure, the gap is described exaggeratedly. In this instance, the movable side receiving plate 22 is supported by an end section of the mold plate drop prevention section 23b in respect to the friction mechanism section 23, the movable side mold 21 and the movable side receiving plate 22 do not fall downward in the figure by the gravity.

Next, when the molds start to close, the movable platen 2 is moved rightward in the figure by the driving section 4. When the molds come close and reach at a distance, the front end section of the taper protruding section 21a of the movable side mold plate 21 goes into the taper recessed section 11a of the fixed side mold plate 11. Then if there is no misalignment between the movable side mold plate 21 and the fixed side mold plate 11, the mold plates thereof moves straight and mold are closed as they are. Then the friction mechanism section 23 is pressed and contracted, thereby the gap between the friction mechanism section 23 and the movable side receiving plate 22 disappears. Further the movable side mold plate 21 and fixed side mold plate 11 contact closely and clamped with a predetermined force. Thereby a molding cavity is formed between both mold plates.

Figure 3:
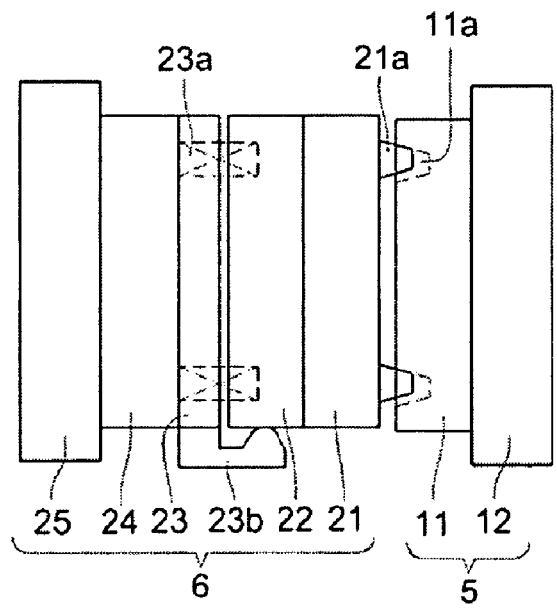
FIG. 3 is an explanatory diagram showing metal molds in a middle of clamping.

However, if there is a misalignment between the movable side mold plate 21 and the fixed side mold plate 11, as FIG. 3 shows, there is caused a state where the taper protruding section 21a and taper recessed section 11a are misaligned. In the figure, the state where the movable side is sifted in respect to the fixed side upward in the figure is indicated exaggeratedly. Then, when the molds are further closed, the taper protruding section 21a follows the taper recessed section 11a, and the molds are closed while the movable side mold plate 21 sifts slightly downward in the figure.

Figure 4:
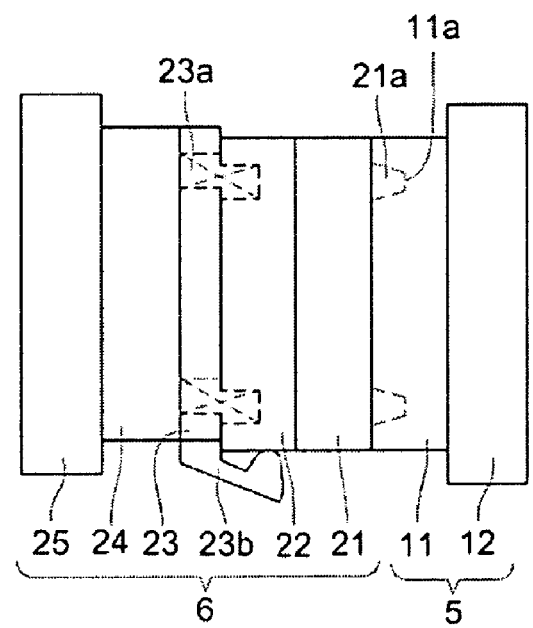
FIG. 4 is an explanatory diagram showing metal molds in a state where clamping is completed.

In the present embodiment, since the friction mechanism 23 is provided, the movable side receiving plate 22 and the movable side mold plate 21 can moved downward as FIG. 4 shows. Thereby, the taper protruding section 21a and the taper recessed section 11a fit each other without conflict. Further, the molds are clamped with the predetermined force and the molding cavity is formed without axis deviation being created. Also, since the mold plate drop prevention member 23b has the flexibility in some degree, it cannot be damaged even if the movable side receiving plate 22 displaces in respect to the friction mechanism section 23 as FIG. 4 shows. Meanwhile, the distortion of the mold plate drop prevention section 23 is shown exaggeratedly.

In the above state, by injecting the molding material into the cavity, an optical element is produced. Here, as the resins used for molding, polyolefin series, polycarbonate, polyester series, acrylic, norbornene series and silicon are preferred.

As described in the forgoing, according to the injection molding apparatus of the present invention, the fixed side metal mold 5 and the movable side metal mold 6 are precisely aligned by the taper protruding section 21a and the taper recessed section 11a. In this instance, since the friction mechanism section 23 is provided, even if misalignment between both metal molds occurs, a hazardous force is not applied to each taper protruding section 21a and taper recessed section 11a. Therefore, there is no possibility that the taper protruding section 21a and taper recessed section 11a will be worn out in bias, thus the displacement of the metal molds cannot be increased even after the open and close of the molds are repeated. Further, the hazardous force is not applied to the tie bars 3. Therefore, the injection metal mold of the present invention does not cause axial misalignment at mold clamping though continuous molding is carried out.

The embodiments have been described, by way of example only, without the present invention being limited thereto, and it is to be understood that changes and variations my be made without departing from the spirit or scope of the appended claims.

Figure 5:
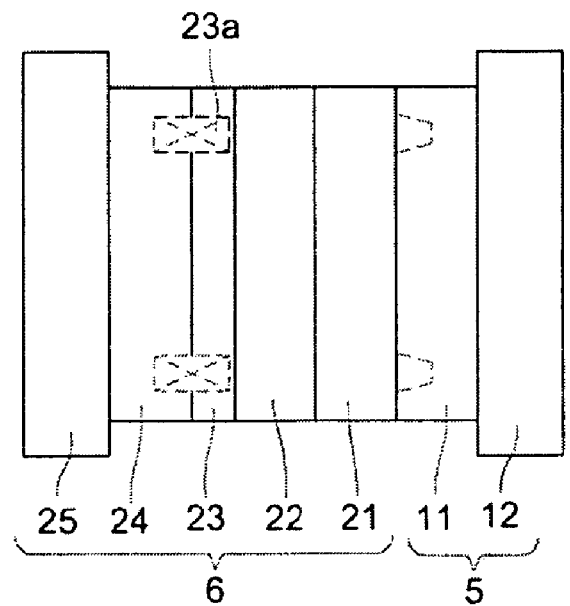
FIG. 5 is an explanatory diagram showing another exemplary arrangement of a friction mechanism section.

For example, the arrangement of the friction mechanism section 23 is not limited to the above embodiments. The friction section 23a can be attached inversely in respect to the above embodiment. In this way, as FIG. 5 shows, the misalignment can be absorbed between the friction mechanism section 23 and the spacer block 24.

Figure 6:
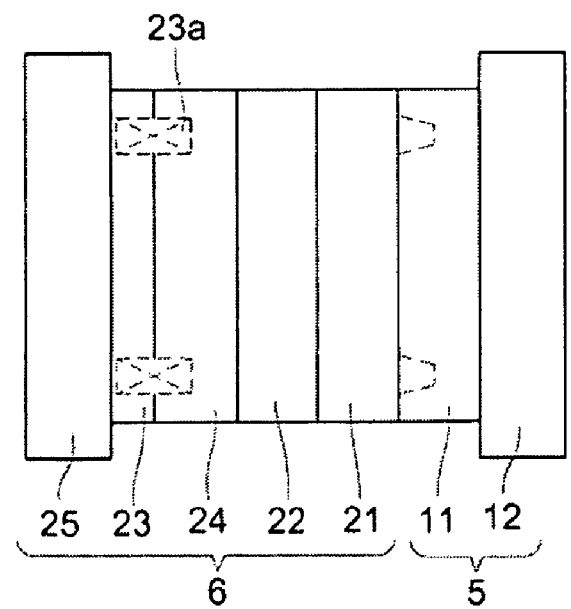
FIG. 6 is an explanatory diagram showing yet another exemplary arrangement of a friction mechanism section.
Figure 7:
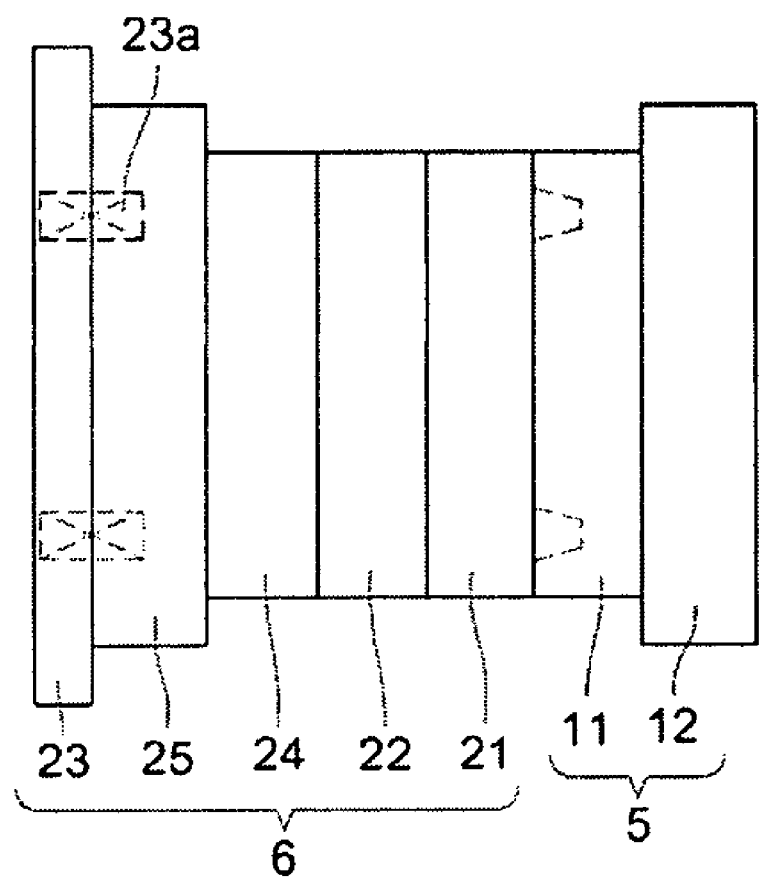
FIG. 7 is an explanatory diagram showing still another exemplary arrangement of a friction mechanism section.

Also, arrangements shown by FIG. 6 and FIG. 7 are possible. Namely, the friction mechanism section 23 can be disposed between the spacer block 24 and the movable side attach plate 25 (FIG. 6), or between the movable side attach plate 25 and the movable platen 2 (FIG. 7). In the above example, the friction section 23a can also be attached inversely. Also, by disposing the friction section 23a at a position shown in FIG. 7, a conventional movable side metal mold 6 is necessary to be modified. Meanwhile, in FIG. 5 to FIG. 7, the mold plate drop prevention section 23b is not shown.

Figure 8:
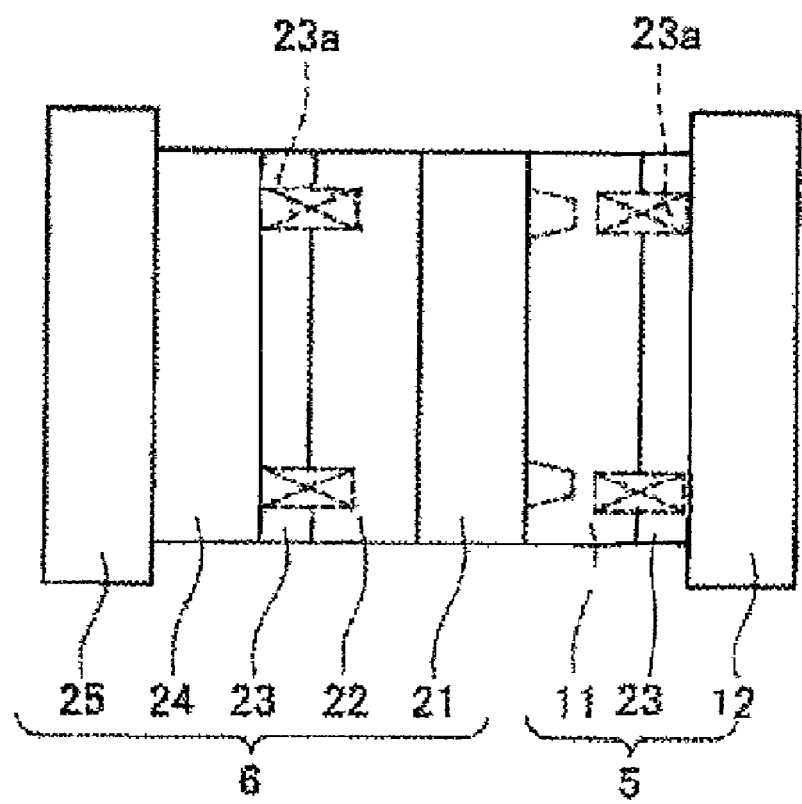
FIG. 8 is an exemplary diagram showing still another exemplary arrangement of a friction mechanism section.

Further, as illustrated in FIG. 8, one more friction mechanism section can be provided between, for example, the fixed side attach plate 12 and the fixed side mold plate 11 of the fixed side metal mold 5.

Also, the arrangement of the mold plate drop prevention section 23b is not limited to the embodiment described in the forgoing as far as it supports the both side portion by grasping the friction mechanism section 23. The front end of the mold plate drop prevention section 23b can support the movable side mold plate 21, or it can be mounted on the spacer block 24 or the movable side attaching plate 25 other than the friction mechanism section 23. In FIG. 5 to FIG. 7, the mold plate drop prevention section 23b can be disposed appropriately respectively.

Also, in the present embodiment, the taper protruding section 21a is formed on the movable side mold plate 21 and the taper recessed section 11a is formed on the fixed side mold plate 11, however, they can be inversed. Further the taper protruding section and the taper recessed section can be disposed on one side in combination.

What is claimed is:

1. An optical element molding apparatus having a first platen and a first mold attached to the first platen and a second platen and a second mold attached to the second platen to mold an optical element, wherein by moving the first platen and the second platen so as to approach each other, the first mold and the second mold are clamped, and a molding material is injected into a formed cavity between both molds while clamping the first mold and the second mold so as to mold the optical element, the optical element molding apparatus comprising:

a first mold matching surface provided at the first mold and a second mold matching surface provided at the second mold, to be matched with the first mold matching surface at mold clamping, provided when clamping the molds;

a first taper shape provided at the first mold matching surface and a second taper shape, to fit with the first taper shape, provided at the second matching surface; and a first friction mechanism disposed between the first platen and the first mold to permit a movement of the first mold in respect to the first platen in a plane perpendicular to a mold clamping direction;

wherein the first friction mechanism includes an elastic member to be compressed in the mold clamping direction when clamping the molds.

2. The optical element molding apparatus of claim 1, wherein the mold clamping direction crosses a gravity direction and the first platen includes a drop prevention member to restrict a downward movement of the first mold by gravity.

3. The optical element molding apparatus of claim 1, further comprising a second friction mechanism between the second platen and the second mold to permit a movement of the second mold in respect to the second platen in a plane perpendicular to the mold clamping direction, wherein the second friction mechanism includes an elastic member to be compressed when clamping the molds.

4. The optical element molding apparatus of claim 1, wherein the first platen is a movable platen and the second platen is a fixed platen.

5. The optical element molding apparatus of claim 1, wherein the first friction mechanism comprises the elastic member and a member having a recess in which the elastic member is disposed.

6. The optical element molding apparatus of claim 1, wherein the first friction mechanism includes a plurality of elastic members which are compressed in the mold clamping direction when clamping the molds.

* * * * *